United States Patent [19]
Barthes et al.

[11] Patent Number: 5,055,650
[45] Date of Patent: Oct. 8, 1991

[54] ELECTRODE CARRIER FOR ELECTRODE-EROSION MACHINING DEVICE

[75] Inventors: Claude P. Barthes, Mennecy; André R. Callet, Paris; Johan D. Ptchelinseff, Chevilly Larue, all of France

[73] Assignee: Societe Nationale D'Etude et de Construction de Moteurs D'Aviation, Paris, France

[21] Appl. No.: 669,609

[22] Filed: Mar. 14, 1991

[30] Foreign Application Priority Data

Mar. 20, 1990 [FR] France ............................... 90 03510

[51] Int. Cl.⁵ ............................................... B23H 7.26
[52] U.S. Cl. ................................ 219/69.15; 219/69.11; 269/20
[58] Field of Search ................. 219/69.15, 69.11, 69.2, 219/138; 279/1 R, 2 R, 2 A, 4; 269/20, 25, 27; 204/224 M

[56] References Cited

U.S. PATENT DOCUMENTS

| | | | |
|---|---|---|---|
| 3,467,592 | 9/1969 | Eisberg, Jr. et al. | 219/69.15 |
| 3,604,883 | 9/1971 | Dietz | 219/69.15 |
| 3,719,579 | 11/1969 | Cross et al. | 219/69.15 |
| 3,803,015 | 4/1974 | Andrews | 204/224 M |
| 3,842,480 | 10/1974 | Mikulski | 204/224 M |

FOREIGN PATENT DOCUMENTS

| | | |
|---|---|---|
| 0241165 | 10/1987 | European Pat. Off. . |
| 0245545 | 11/1987 | European Pat. Off. . |
| 0248509 | 12/1987 | European Pat. Off. . |
| 3037085 | 5/1981 | Fed. Rep. of Germany ... 219/69.15 |
| 1304170 | 8/1962 | France . |
| 2165361 | 8/1973 | France . |
| 1341911 | 12/1973 | United Kingdom ............. 219/69.15 |

*Primary Examiner*—Geoffrey S. Evans

[57] ABSTRACT

An electrode carrier for mounting the electrodes of an electrode-erosion machining device having the capabilities of effectively clamping a plurality of needle-type electrodes in a short amount of time, without applying excessive forces to the electrodes. The electrode carrier has a mounting body defining a cavity, as well as passageways, through which the electrodes pass such that they extend through a cavity. A deformable elastic material is disposed within the cavity in contact with portions of the electrodes. A clamping piston is urged into contact with the deformable elastic material such that it applies a compression force on the material causing it to deform and clamp the electrodes in the mounting body.

12 Claims, 1 Drawing Sheet

ELECTRODE CARRIER FOR ELECTRODE-EROSION MACHINING DEVICE

BACKGROUND OF THE INVENTION

The present invention relates to an electrode carrier for an electrode-erosion machining device, specifically such a carrier for mounting a plurality of elongated electrodes for forming precision holes in a workpiece.

Devices for machining workpieces by the electrode-erosion process are well known in the art. French Patent 1,304,170 describes such an electrode-erosion device having a movable electrode to shape a workpiece by intermittent electrical discharges between the electrode and the workpiece. European Patent 0 144 616 also discloses an electrode-erosion machining device wherein the electrode is supported on an assembly to enable the machining of workpieces in generally inaccessible locations.

Electrode-erosion machining devies have found particular usage in forming a plurality of holes in workpiece by using a corresponding number of small diameter, elongated electrodes of the needle type. French Patent 2,165,361 discloses a device for clamping and guiding very fine electrodes using a jaw-type clamping device. European Patents 0 241 165 and 0 248 509 disclose electrode-erosion machining devices wherein the electrodes are mounted in interchangeable cartridges.

The known devices, while generally successful, have not alleviated all of the problems associated with such electrode-erosion machining techniques. When using multiple electrodes, especially a large number of such electrodes located close to each other, different clamping devices must be used for each configuration of the electrodes. It is also proven to be difficult to ensure the simultaneous clamping of the electrodes which are usually set up in the desired orientation, in a resonable amount of time, without the risk of insufficiently clamping the electrodes or applying excessive forces to the electrode, causing them to rupture.

SUMMARY OF THE INVENTION

An electrode carrier for mounting the electrodes of an electrode-erosion machining device is disclosed having the capabilities of effectively clamping a plurality of needle-type electrodes in a short amount of time, without applying excessive forces to the electrodes. The electrode carrier has a mounting body defining a cavity, as well as passageways, through which the electrodes pass such that they extend through a cavity. A deformable elastic material is disposed within the cavitty in contact with portions of the electrodes. A clamping piston is urged into contact with the deformable elastic material such that it applies a compression force on the material causing it to deform and clamp the electrodes in the mounting body.

The clamping piston may also define passageways through which the electrodes extend. The electrodes may also be hollow and the device may be attached to a tank so as to supply dielectric liquid to the interior of the electrodes.

The mounting body may define an output side which faces the workpiece being machined and an opposite side which defines the cavity. The clamping piston may by urged into contact with the deformable elastic material by contact with a force transmitting member which is, in turn, in contact with a threaded member threadingly engaged with the mounting body. Rotation of the threaded member urges the clamping piston in an axial direction so as to exert a compressing force on the deformable material.

DETAILED DESCRIPTION OF THE PREFERRED EMBODIMENT

Figure 1:
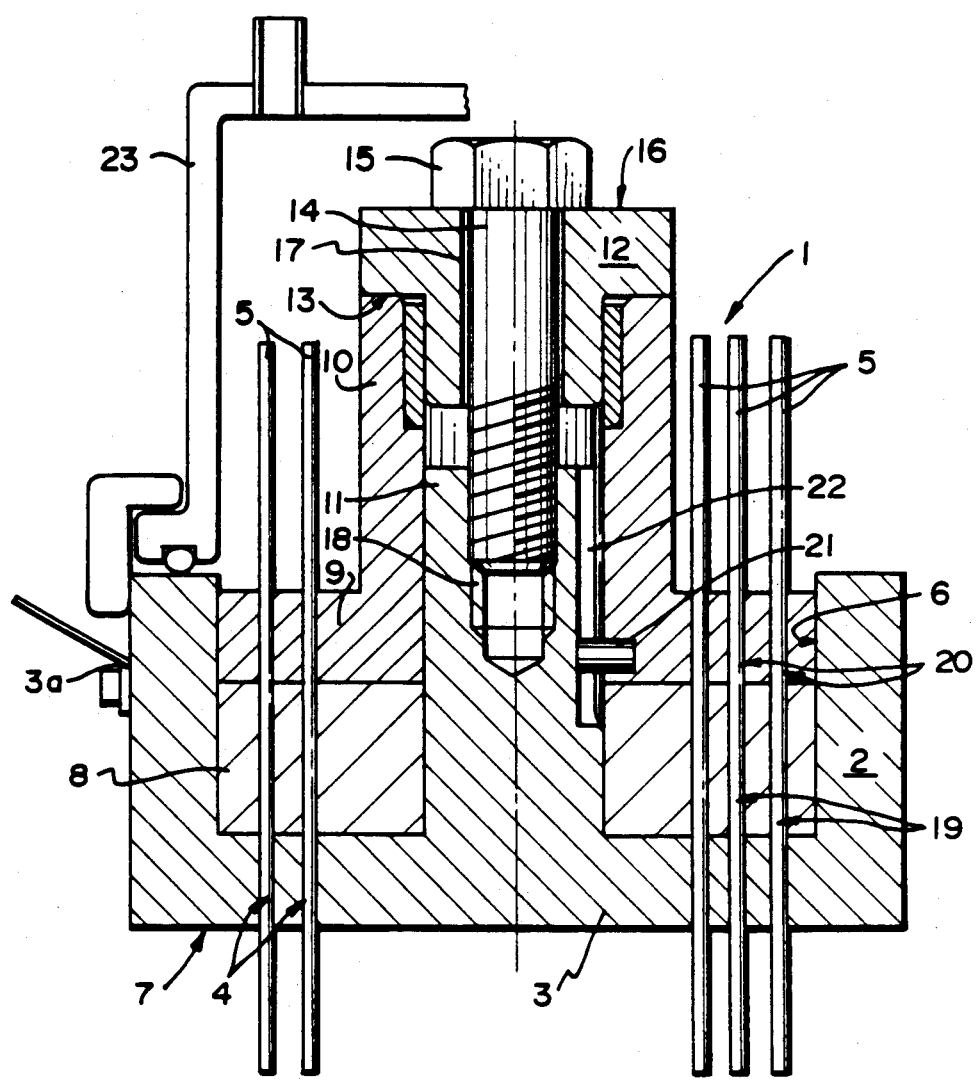
FIG. 1 is a lateral, cross-sectional view of the electrode carrier according to the present invention.
Figure 2:
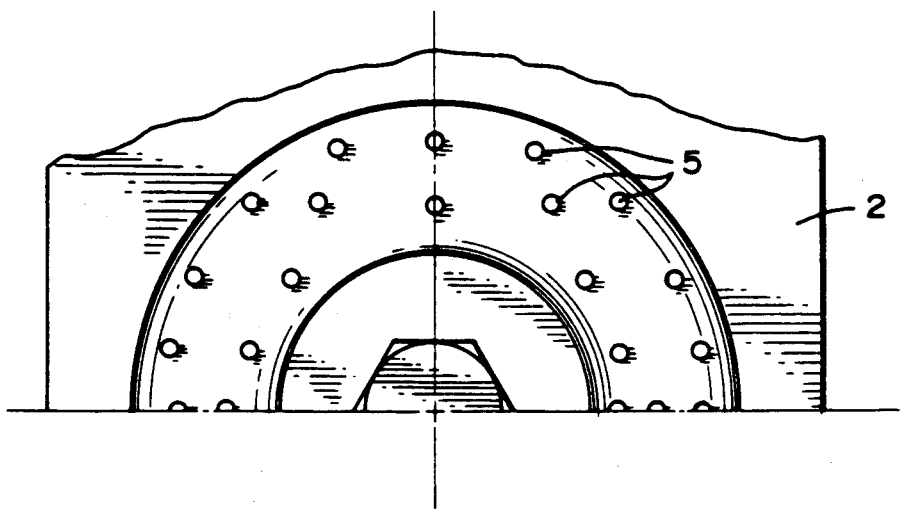
FIG. 2 is a partial, top view of the electrode carrier in FIG. 1.

The electrode carrier according the present invention, as illustrated in FIGS. 1 and 2, will be described in conjunction with its use for mounting a plurality of electrodes for machining precisely aligned holes in a workpiece having a geometrical axis of revolution, particularly such workpieces for use with an aircraft engine. Quite obviously, the electrode carrier may be used for machining workpieces having other geometrical shapes, the particular arrangement of the electrodes being adapted to the particular form of the workpiece as necessary.

The electrode carrier 1 comprises a mounting body 2 having a base portion 3 defining a plurality of passageways 4 adapted to receive the electrodes 5. The arrangement of the electrodes may be as illustrated in FIG. 2, but any other orientation is believed to be within the scope of this invention. Passageways 4 are made with great precision so as to insure the passage of the electrical current into electrodes 5 from a supply source 3a through the electrically conducting mounting body 2. The precise formation of the passageways 4 also insure the precision of the perforations in the workpiece made by the electrodes 5.

The mounting body 2 has an output face 7 which faces the workpiece being machined as well as an opposite side, which defines a cavity 6. In the embodiment illustrated in the figures, cavity 6 is generally annular in shape and has a generally rectangular cross-section such that three sides of the cross-section are enclosed by the mounting body.

A block 8 of deformable elastic material, made by known molding and polymerization techniques is located within the cavity 6. The deformably elastic material should have sufficient rigidity, especially in the compressed state to clamp the electrodes 5 in the mounting body. The deformable elastic material 8 may comprise a cold-polmerizable silicon resin material.

A clamping piston 9 extends into the cavity 6 through the open side and contacts the side of the deformable elastic material 8. The piston 9 also has a generally annular shape to conform to the shape of the cavity. Quite obviously, if cavities having other shapes utilized, the shape of the piston should correspond to the shape of the cavity.

The piston 9 has a hollow hub portion 10 which is slidably received on the elongated shaft portion 11 of the mounting body 2. The upper end 13 of the hub 10 is in contact with force transmitting member 12, as illustrated in FIG. 1.

A threaded member 14, such a a screw, bolt, or the like, having a head portion 15 extends through the force transmitting member 12 such that the head 15 contacts surface 16 of the force transmitting member 12. The threaded member 14 is engaged with a tapped hole 18 formed in the elongated shaft 11.

To mold the block 8 of the deformable elastic material, electrodes 5 are placed in position through passageways 4 and passageways 20 defined by the clamping piston 9 which is withdrawn from the cavity 6 in order to permit the filling of the cavity with elastic material. The deformable elastic material is initially in the liquid state and may be easily placed into the cavity 6. The polymerization of the elastic material 8 causes it to surround the portion of the electrodes 5 extending through the cavity 6 so as to form passages 19.

In order to prevent the exertion of undue forces on the electrodes 5 during clamping, anti-rotation means are provided between the piston 9 and the mounting body 2. The anti-rotation means may comprise a pin 21 fixedly attached to the clamping piston 9, which pin is slidably received in slot 22, defined in an outer surface of the elongaged shaft portion 11 of the mounting body. During the molding of the deformable elastic material 8, the portions of electrodes 5 extending through the cavity may be coated with an anti-adhesion product of the known type to prevent the adhesion of the deformably elastic material to the outer surfaces of the electrodes. This anti-adhesion product may be known type of silicon grease.

In the operation of the electrode carrier according to this invention, the electrodes 5 are adjusted to their desired postions relative to the mounting body 2, the block 8 of the deformable elastic material and the clamping piston 9. The electrodes 5 may be independently adjusted prior to their clamping in positions to readily adapt the electrode carrier to machining workpieces having flat surfaces, curved surfaces or other types of surfaces.

Once the electrodes 5 have been placed in their desired positions, threaded member 14 is threaded into mounting body 2, causing axial movement of the clamping piston 9 into the cavity 6, thereby exerting a compression force on the deformable elastic material 8. The isostatic pressure of the deformable elastic material 8 causes it to deform and exert a clamping force on all of the electrodes 5 in order to hold them in their desired positions.

In certain applications, such as those for making deep perforations, electrodes having hollow interiors are utilized. This technique requires the simultaneous injection of dielectric liquid into the interior of the electrodes. The electrodes 5, as illustrated in FIG. 1, may extend beyond the clamping piston 9 and the mounting body 2 may be affixed to a tank 23 such that the ends of the electrodes 5 extend into the tank. The dielectric liquid may be supplied to the interior of the tank 23, in known fashion, such that it passes into the hollow interior of the electrodes.

The foregoing description is provided for illustrative purposes only and should not be construed as in any way limiting this invention, the scope of which is defined solely by the appended claims.

We claim:

1. An electrode carrier for electrodes of an electro-erosion machining device comprising:
   a) a mounting body defining a plurality of passageways, each adapted to receive an electrode therethrough, the mounting body also defining a cavity;
   b) an electrode disposed in the passageways of the mounting body such that at least a portion of the electrodes extend into the cavity;
   c) a deformable elastic material disposed in the cavity in contact with the portions of the electrodes in the cavity;
   d) a clamping piston having a portion extending into the cavity in contact with the deformable elastic material; and,
   e) means to move the clamping piston into the cavity to apply a compression force on the deformable elastic material such that the elastic material deforms so as to exert a clamping force on the electrodes in the mounting body.

2. The electrode carrier of claim 1 wherein the means to move the clamping piston into the cavity comprises:
   a) a force transmitting member in contact with the clamping piston; and,
   b) a threaded member in contact with the force transmitting member and threadingly engaged with the mounting body such that rotation of the threaded member causes axial movement of the force transmitting member and the clamping piston.

3. The electrode carrier of claim 1 wherein the clamping piston defines second passageways adapted to receive the electrode therethrough.

4. The electrode carrier of claim 1 wherein the mounting body defines a generally annular-shaped cavity.

5. The electrode carrier of claim 4 wherein the mounting body has an output side adapted to face a workpiece being machined and an opposite side, the opposite side defining the cavity.

6. The electrode carrier of claim 1 wherein the deformable elastic material is a silicon resin.

7. The electrode carrier of claim 1 wherein the electrodes are hollow.

8. The electrode carrier of claim 7 further comprising means to supply a dielectric liquid to the hollow interior of the electrodes.

9. The electrode carrier of claim 8 wherein the means to supply the dielectric liquid comprises a tank sealingly in contact with the mounting body, an interior of the tank communicating with ends of the hollow electrodes.

10. The electrode carrier of claim 4 wherein the mounting body has a generally centrally located, elongated shaft portion and wherein the clamping piston is slidably mounted on the elongate shaft portion.

11. The electrode carrier of claim 10 further comprising anti-rotation means operatively interposed between the elongated shaft portion and the clamping piston to prevent relative rotation therebetween.

12. The electrode carrier of claim 11 wherein the anti-rotation means comprises:
   a) a slot defined by the elongated shaft portion; and,
   b) a pin member attached to the clamping piston and slidably extending into the slot.

* * * * *